(12) United States Patent
Roberts et al.

(10) Patent No.: US 10,086,709 B2
(45) Date of Patent: Oct. 2, 2018

(54) VARIABLE WAKEUP OF A HIGH-VOLTAGE CHARGER BASED ON LOW-VOLTAGE SYSTEM PARAMETERS

(71) Applicant: Ford Global Technologies, LLC, Dearborn, MI (US)

(72) Inventors: Daniel Paul Roberts, Livonia, MI (US); William Najib Mansur, West Bloomfield, MI (US); Mark Douglas Malone, Canton, MI (US); Beth Ann Dalrymple, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 15/182,142

(22) Filed: Jun. 14, 2016

(65) Prior Publication Data

US 2017/0355268 A1    Dec. 14, 2017

(51) Int. Cl.
| | | |
|---|---|---|
| *H02J 7/00* | (2006.01) | |
| *H02J 7/14* | (2006.01) | |
| *B60L 11/02* | (2006.01) | |
| *B60K 6/28* | (2007.10) | |
| *B60K 6/40* | (2007.10) | |
| *B60L 11/18* | (2006.01) | |

(52) U.S. Cl.
CPC ............... *B60L 11/02* (2013.01); *B60K 6/28* (2013.01); *B60K 6/40* (2013.01); *B60L 11/182* (2013.01); *B60L 11/185* (2013.01); *B60L 11/1816* (2013.01); *B60L 11/1861* (2013.01); *B60L 2230/16* (2013.01); *B60L 2240/80* (2013.01); *B60L 2250/18* (2013.01); *B60Y 2200/92* (2013.01); *B60Y 2300/91* (2013.01); *Y10S 903/907* (2013.01); *Y10S 903/951* (2013.01)

(58) Field of Classification Search
CPC ..................................................... B60L 11/02
USPC ......................................................... 320/109
See application file for complete search history.

(56) References Cited

U.S. PATENT DOCUMENTS

| | | | |
|---|---|---|---|
| 8,482,255 B2 * | 7/2013 | Crombez | ............ B60L 11/1862 320/109 |
| 8,618,771 B2 | 12/2013 | Ichikawa | |
| 8,918,376 B2 | 12/2014 | Ambrosio et al. | |
| 8,981,727 B2 | 3/2015 | Kusch et al. | |
| 2011/0168462 A1 | 7/2011 | Stanek et al. | |
| 2014/0354195 A1 | 12/2014 | Li et al. | |

* cited by examiner

*Primary Examiner* — Edward Tso
*Assistant Examiner* — Ahmed Omar
(74) *Attorney, Agent, or Firm* — David B. Kelly; Brooks Kushman P.C.

(57) ABSTRACT

A method of operating a vehicular system includes charging, by a controller and via an electric vehicle charge station, a low-voltage battery when a module powered by the low-voltage battery is awake and an SOC of the low-voltage battery is less than a threshold; and in response to the SOC exceeding the threshold, commanding by the controller the module to enter a sleep mode for a sleep duration defined by a power usage of the module such that as the power usage changes, the sleep duration changes.

19 Claims, 4 Drawing Sheets

VARIABLE WAKEUP OF A HIGH-VOLTAGE CHARGER BASED ON LOW-VOLTAGE SYSTEM PARAMETERS

TECHNICAL FIELD

This application is generally related to varying a sleep time of a vehicle traction battery charger based on low-voltage system parameters.

BACKGROUND

Electrified vehicles include hybrid electric vehicles (HEV) and battery electric vehicles (BEV). Electrified vehicles include a traction battery to store energy to be used for propulsion and other purposes. The traction battery is generally operated using various parameters that are defined during the development phase. Over time, operating parameters of the traction battery change causing changes in performance of the traction battery.

SUMMARY

A method of operating a vehicular system includes charging, by a controller and via an electric vehicle charge station, a low-voltage battery when a module powered by the low-voltage battery is awake and an SOC of the low-voltage battery is less than a threshold; and, in response to the SOC exceeding the threshold, commanding by the controller the module to enter a sleep mode for a sleep duration defined by a power usage of the module such that as the power usage changes, the sleep duration changes.

A vehicle includes a module and a controller. The module is powered by a low-voltage battery. The controller is configured to, while coupled with a charge station, route current to the low-voltage battery after expiration of a time period that has a duration defined by a parameter associated with the low-voltage battery and a change in low-voltage battery current associated with the module.

A vehicle includes a controller that is configured to, while coupled with a charge station, route current from the charge station to a low-voltage battery in response to an SOC of the low-voltage battery being below a threshold and an expiration of a sleep duration defined by a parameter associated with the low-voltage battery and a change in low-voltage battery current.

DETAILED DESCRIPTION

Figure 1:
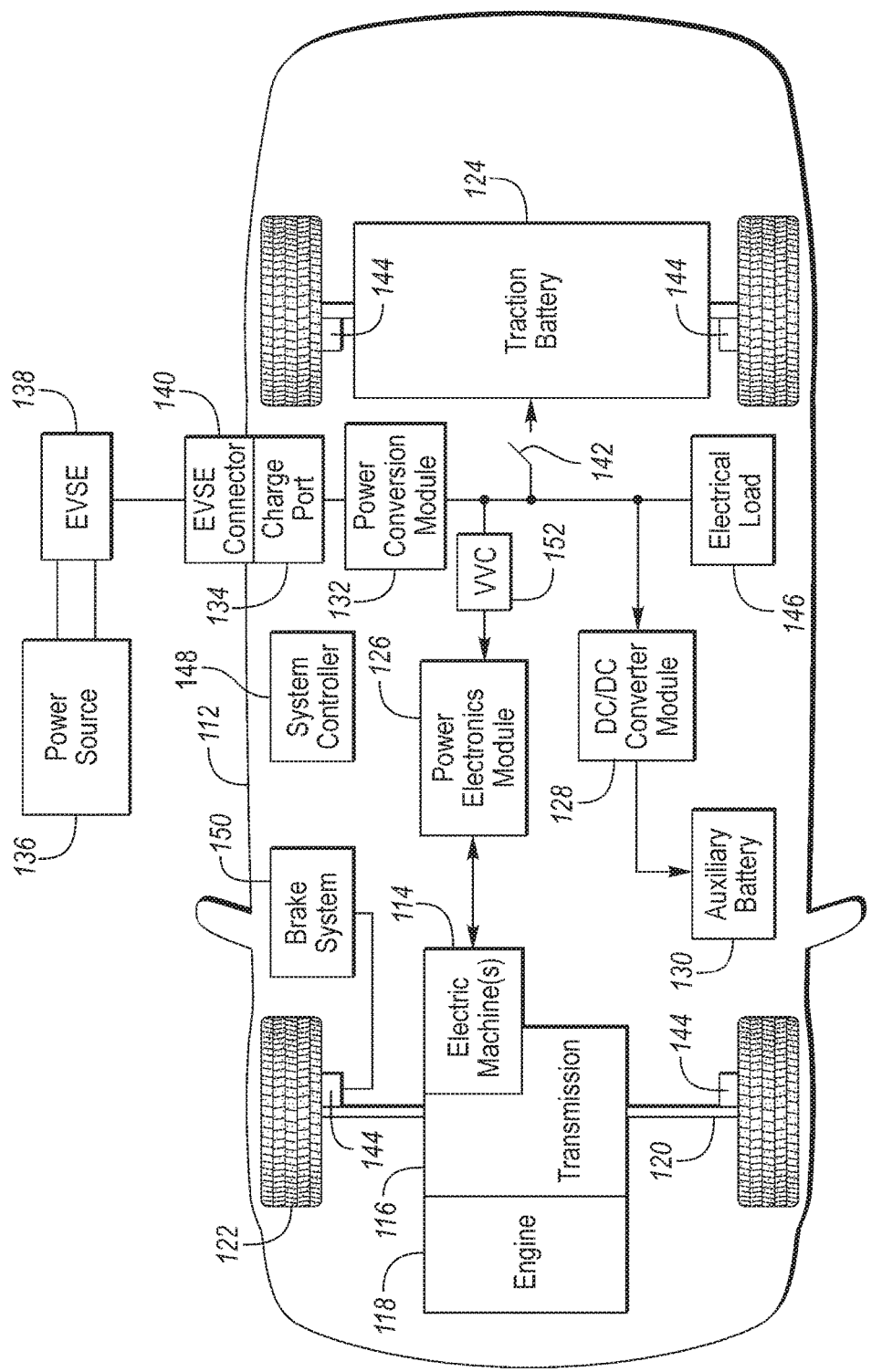
FIG. 1 is a diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As technology is developed, a vehicle architecture changes. One architectural change is the use of multiple batteries in a vehicle. Vehicles having multiple batteries include Plug-In Hybrid vehicles (PHEVs), Battery Electric Vehicles (BEVs), Hybrid Electric Vehicles (HEVs), and select non-hybrid vehicles utilizing a dual low-voltage battery system. Typically, PHEV's and BEVs are configured to connect with an external charger via a plug. Select HEVs may be configured to connect to a charger via an inductive pad without having the ability to be directly plugged in via a plug. In both cases, charging is focused on supplying a charge to a traction battery and not the low voltage battery. However, most vehicle modules are powered by the auxiliary battery and not the traction battery; therefore, although the traction battery provides propulsion, the auxiliary battery provides power to run electronic modules in the vehicle. The traction battery typically operates at a high voltage (i.e., a voltage over 100 volts) while the auxiliary battery typically operates at a low voltage also referred to as low-voltage that is less than 100 volts DC such as 12 volts or 24 volts. As the batteries are coupled, by providing a charge to just one of the two batteries in a dual battery system, a charge may occur to both batteries, but the charging is typically based on state of health of the traction battery.

A non-hybrid vehicle utilizing a dual low-voltage battery system includes a dual battery vehicle involving two 12-volt batteries. Also, a non-hybrid vehicles utilizing a dual low-voltage battery system may include batteries with similar or dissimilar battery cell chemistry, for example, a vehicle with an internal combustion engine (ICE) for propulsion may use a Lead-Acid battery to start the ICE and either a Lead-Acid or Lithium-ion battery to support non-starting related electrical loads.

Reliance on the stored energy provided by vehicular batteries is ever growing as new technology is added to a vehicle and as new portable consumer electronic device are integrated with the vehicle. A variable time sleep interval for charging may help increase battery robustness and reduce early battery degradation.

Currently charging technology used today relies on notification of readiness of the primary battery and, when necessary, charge is supplied to the primary battery until the desired level of stored energy is met. During charging, energy may or may not flow to the secondary battery dependent upon system implementation, system architecture, and a state of that system. However, this process leaves the readiness of the secondary battery indeterminate in terms of the level of stored energy present when charge completion of the primary battery is reached.

Here, an electric vehicle charge station also referred to as electric vehicle supply equipment (EVSE) provides energy to the low voltage battery (e.g., 12V battery) directly through the high voltage charging system of the vehicle. A state of charge of the traction battery and the auxiliary battery will be monitored during charging event or while coupled with the EVSE. Once the low voltage battery is brought up to the desired level of stored energy, the flow from the EVSE may be halted. This process utilizes a variable wakeup time interval that is controlled separate from the primary battery charge procedure. The process also includes a notification of low voltage or low SOC in the secondary battery while operating in a charging mode.

Based on the notification, the system may wait for approval by an authorized individual or the approval may be automatically generated based on criteria entered by an authorized individual if previously configured to activate the charging station. To ensure the desired state of charge is reached in one or more batteries without overcharging, a DC/DC convertor may be used to convert the voltage level to the appropriate level for the battery. In another embodiment, a system may utilize a DC/DC in the external charger to provide a voltage at a level compatible with the secondary battery. The system notifies a vehicle owner of potential billing or point-of-sale charges. Further, this system may be configured to support wireless charging for low voltage batteries (e.g., 12V) or high voltage batteries (e.g., greater than 100V).

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
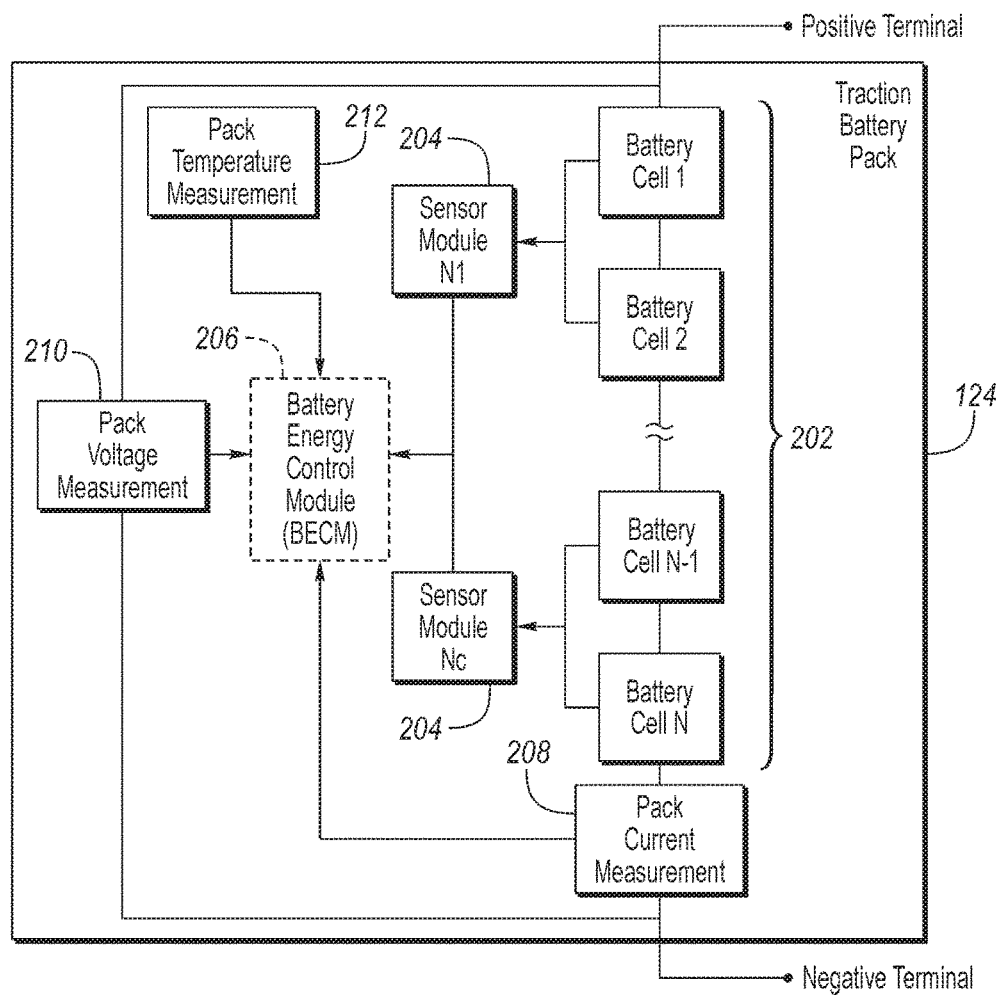
FIG. 2 is a diagram of a possible battery pack arrangement comprised of multiple cells, and monitored and controlled by a Battery Energy Control Module.

The traction battery 124 may be constructed from a variety of chemical formulations. Typical battery pack chemistries may be lead acid, nickel-metal hydride (NIMH) or Lithium-Ion. FIG. 2 shows the traction battery pack 124 as a simple series configuration of N battery cells 202. The traction battery 124, however, may be composed of any number of individual battery cells connected in series or parallel or some combination thereof. A battery management system may have one or more controllers, such as a Battery Energy Control Module (BECM) 206, that monitor and control the performance of the traction battery 124. The traction battery 124 may include sensors to measure various pack level characteristics. The traction battery 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The traction battery 224 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

It may be useful to calculate various characteristics of the battery pack. Quantities such as battery power capability, battery capacity, and battery state of charge may be useful for controlling the operation of the traction battery 124 as well as any electrical loads receiving power from the traction battery 124. Battery power capability is a measure of the maximum amount of power the traction battery 124 can provide or the maximum amount of power that the traction battery 124 can receive. Knowing the battery power capability allows the electrical loads to be managed such that the power requested is within limits that the traction battery 124 can handle.

Battery capacity is a measure of a total amount of energy that may be stored in the traction battery 124. The battery capacity (often represented by variable Q) may be expressed in units of Amp-hours. Values related to the battery capacity may be referred to as amp-hour values. The battery capacity of the traction battery 124 may decrease over the life of the traction battery 124.

State of charge (SOC) gives an indication of how much charge remains in the traction battery 124. The SOC may be expressed as a percentage of the total possible charge remaining in the traction battery 124. When the SOC is at one hundred percent, the traction battery 124 may be charged to the battery capacity. The SOC value may be output to inform the driver of how much charge remains in the traction battery 124, similar to a fuel gauge. The SOC may also be used to control the operation of an electric or hybrid-electric vehicle. Calculation of SOC can be accomplished by a variety of methods. One possible method of calculating SOC is to perform an integration of the traction battery current over time. This is well-known in the art as ampere-hour integration.

An energy management system or vehicle power system may operate the traction battery 124 to manage the state of charge of the traction battery 124. The traction battery 124 may be charged or discharged according to a target state of charge compared to a present state of charge. For example, when the present state of charge is greater than the target state of charge, the traction battery 124 may be discharged. Operation of the traction battery 124 may be achieved by commanding a torque of the electric machines 114 to draw current from or provide current to the traction battery 124. Operation of the traction battery 124 may further involve commanding operation of the engine 118 to provide power to the electric machines 114 to charge the traction battery 124.

Values that are often computed for the traction battery 124 may be state of health (SOH) related parameters. The SOH parameters may provide an indication of the age of the traction battery 124. The SOH parameters may also provide information on the state of the battery and how the battery has degraded over time. The SOH parameters may include a computed battery capacity and a battery internal impedance. The SOH parameters may indicate a change to the battery capacity and the battery internal impedance. The battery internal impedance may be represented as a resistance value. As the traction battery 124 ages, the battery internal impedance may change. The battery internal impedance generally increases as the battery degrades. Knowledge of the battery internal impedance and battery capacity allows for improved control of the traction battery 124. Various methods are available to determine the SOH of the traction battery 124. A battery age indicator may be output and displayed based on the battery capacity and/or the battery internal impedance values. For example, the battery capacity and/or battery internal impedance values may be compared to corresponding values at a beginning of battery life to determine an approximate age of the traction battery.

Figure 3:
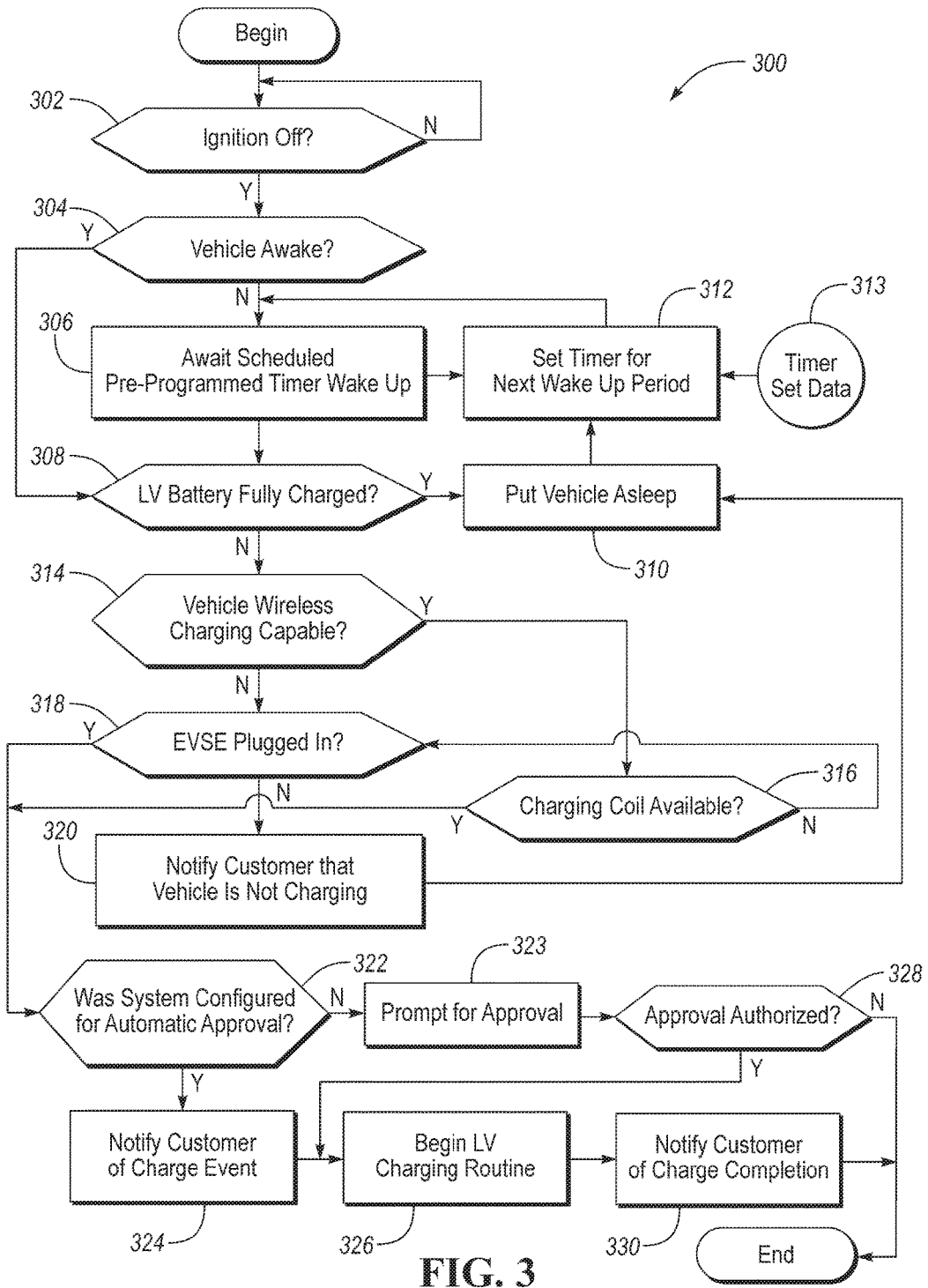
FIG. 3 is a flow diagram of a variable time interval wakeup strategy for a traction battery charging procedure.

FIG. 3 is a flow diagram 300 of a variable time interval wakeup strategy for a traction battery charging procedure. Here, a controller is used to schedule a timer based on characteristics of a secondary battery to cycle between a low power mode (i.e., sleep mode) and an awake mode (i.e., run mode). The controller continuously monitors the status of the ignition until the ignition is in an off condition. In operation 302, the controller waits until the vehicle is in an ignition-off state (e.g., the ignition key is in an off position). When the ignition is in an off state, the controller proceeds to operation 304.

In operation 304, the controller branches to operation 306 if the vehicle is not awake and branches to operation 308 if the vehicle is awake. Generally, vehicles are configured such that after the ignition key is in an off position, the vehicle enters into a low-power or sleep mode. Entry into the low-power mode may be delayed for a predetermined time so that convenience and comfort systems of the vehicle remain powered for an expected time. For example, interior lights may remain lit for a predetermined time to provide illumination such that passengers may collect belongings and exit the vehicle. Also, vehicle infotainment systems may remain active so that playing of media content is not terminated prior to an expected action or time. An example of an expected action is the opening of a driver side door of the vehicle being indicative of a desire to shut off the infotainment center, while absence of activation of any door handle may be indicative of a desire to maintain power to the infotainment system such that passengers continue to hear the media program. After the time-out or the action, modules of the vehicle may enter a low-power or sleep mode. In this flow diagram, the ignition off condition is a state in which modules within the vehicle are in a low power mode while the ignition is in a key-off state.

In operation 306, the controller while in a low power mode waits for a timer to expire, upon which the module wakes up and proceeds to operation 308. In operation 308, the controller checks the state of charge (SOC) of the traction battery. If the traction battery is at or above a predetermined upper level (e.g., full charge) the controller branches to operation 310 to set a timer for the next wakeup. In operation 312 the controller sets a flag to put the vehicle and modules of the vehicle into a low power mode (e.g., sleep mode) and proceeds to operation 306. In operation 310, the controller calculates a sleep period based on historical data and preprogrammed values 313. Some modules may sleep for an indefinite period of time unless they receive a wakeup request; however most modules sleep for a predetermined time period. Here in 312 and 313, a variable time period is used to maximize the time modules are in a low power mode. Once the time period is set in operation 310, the controller continues to operation 306.

If the traction battery is below the predetermined upper level (e.g., less than a full charge) the controller branches to operation 314. In operation 314, the controller must determine what type of charger is available to the vehicle. Electric vehicles may be equipped with multiple methods of charging, including Level 1 or 2 AC charging, DC Fast Charging, or wireless inductive charging. If the vehicle is configured with wireless charging capability, the controller proceeds to step 316 where the controller determines if the vehicle is actively connected to a wireless charging station. In order for wireless charging to function properly, the vehicle must be accurately parked over a charging coil, otherwise the vehicle may not charge or do so inefficiently. The charging process 322 begins once an active wireless connection is detected.

If in operation 314, it is determined that the vehicle is not configured with wireless charging capability, or the wireless charger is not connected, then the controller will proceed to operation 318 and check for a hardwired EVSE. After determining that the EVSE is plugged in, the controller will begin the charging process in operation 322. In situations where the EVSE or DC fast charge connections are available in addition to the wireless charging coil, the controller will the wire connections as a backup when wireless charging is not available or faulted. In other embodiments, the controller may select the wire connection over the wireless connection. In situations where neither an EVSE or wireless charging is available, the controller will notify the customer that the vehicle is not charging in operation 320.

When an active connection is detected, the controller checks if the system was configured for automatic approval in operation 322. Some charging stations require payment for the electricity used and/or for the use of the EVSE. A driver may decide to setup automatic approval based on a maximum cost per KW/hr or maximum connection fee an operator is willing to pay. Also, the controller may be configured to request a prompt message for approval in operation 323. This reduces the chance that a vehicle owner is inadvertently charged for energy without their explicit approval. When automatic approval is enabled and the battery is able to receive a charge based on the SOC of the battery, the controller transmits a charge event notification in operation 324 and activates the vehicle's charging system in operation 326. If automatic approval is not enabled, the controller in operation 323 outputs a prompt for approval. Based on a response the controller receives in operation 328, the controller may begin the charging routine in operation 326 after the battery is fully charged; the controller may output a notification that the charge is complete in operation 330. If the controller does not receive a response or the response is a decline of the request, the controller will exit the routine. After the controller may set the wakeup timer based on a variable time base to conserve remaining power. The timer can also be set to a variable time base when no charging sources are available to conserve remaining energy as well.

Figure 4:
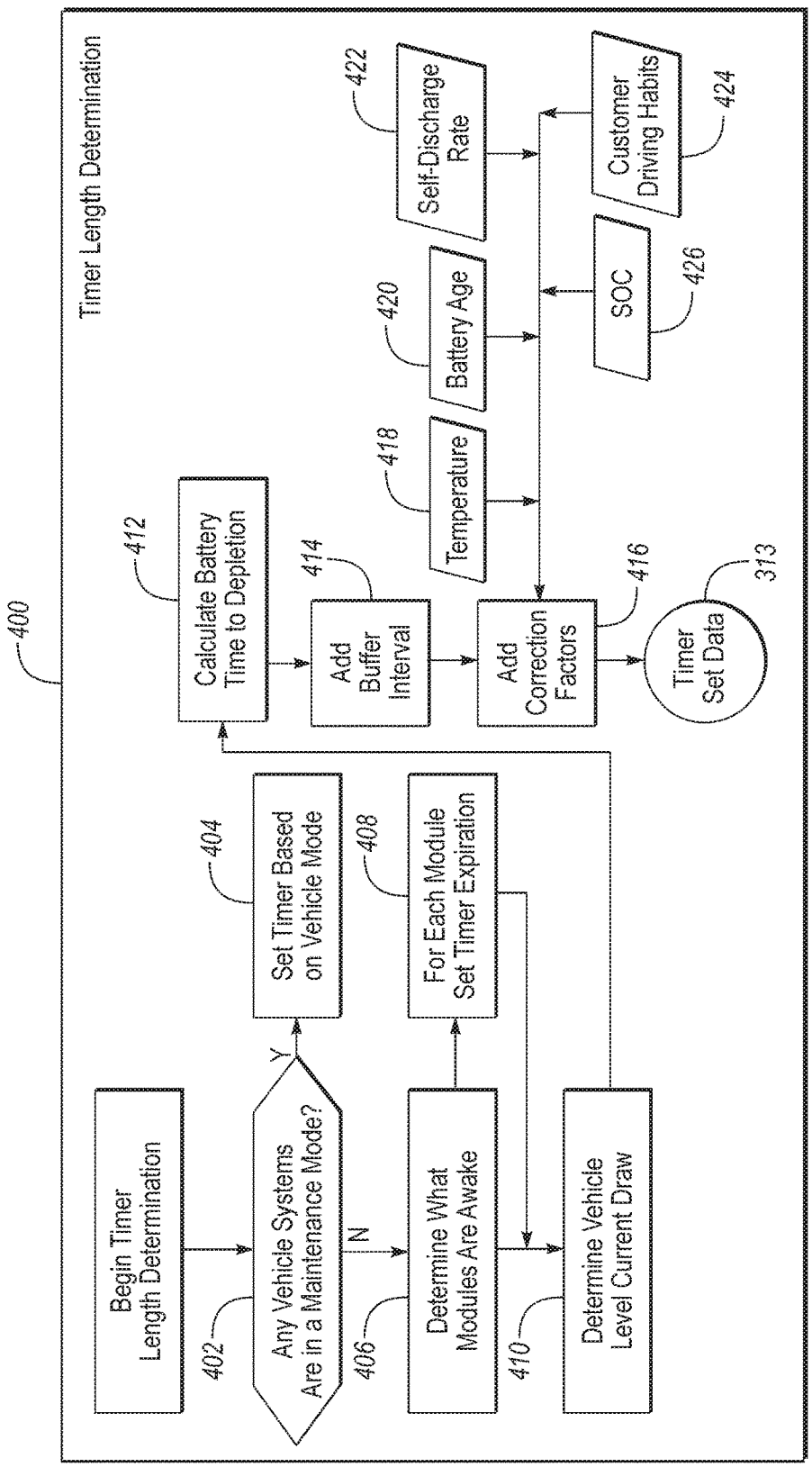
FIG. 4 is a flow diagram of a variable wakeup time interval for a traction battery charging procedure based on low voltage battery operation.

FIG. 4 is a flow diagram 400 of a variable wakeup time interval for a traction battery charging procedure based on low-voltage battery operation. A controller may perform a timer length determination continuously, during wake-up, or according to a predetermined time interval. The predetermined time interval may be based on a change in a SOC of the low-voltage battery.

In operation 402, the controller interrogates modules of the vehicle to assess if the vehicle is operating in a maintenance mode. Vehicles have many maintenance modes, which can include High-Voltage battery cell balancing, evaporative emission systems diagnostic tests, or software updates. Duration of the modes and power consumption while in these modes is generally fixed and known. Data associated with the duration and power consumption may be hard coded into the controller so that an accurate sleep period may be calculated. If the vehicle is in a maintenance mode, the controller will branch to operation 404 and set the time value based on that mode and proceed to operation 313.

If the vehicle is not in a maintenance mode, controller will branch to operation 406. In operation 406, the controller will determine what modules are awake. It will then use this data to determine the vehicle current draw in operation 410 and calculate battery time to depletion in operation 412. The battery time to depletion may also be calculated using a battery management sensor (BMS), which monitors the health and usage characteristics of the low-voltage battery. Once a time to depletion is calculated based upon available data, the controller will add a pre-programed buffer interval in operation 414 and correction factors in operation 416 to reduce the chance that the battery is depleted before the next wakeup. This data creates the timer set data in operation 313.

The correction factors are parameters of the low-voltage battery that include temperature 418, age 420, self-discharge rate 422, SOC 426, and customer driving habits 424. For example, as the age 420 increases, the correction factor may decrease the duration. Another example is an increase in a self-discharge rate 422 may change the correction factor such that the duration decreases. Further, as the temperature 418 increases, the correction factor may decrease the duration. Also, the customer driving habits 424 may include a profile of a current of the low-voltage battery indicative of use of accessories and vehicle systems such as a heating, ventilating, and air conditioning (HVAC) system, a seat heater, and other comfort and convenience systems. Often, when a vehicle is connected to an EVSE, the vehicle may draw power from the EVSE to operate an HVAC system to change the interior cabin temperature of the vehicle. As a change in temperature between a desired interior cabin temperature and an ambient temperature increases, a controller may increase a power draw from the EVSE to operate the HVAC system. As usable energy decreases, these parameters may be used to calculate a battery time to depletion. A battery self-discharge rate can increase as the battery ages, which means that the battery SOC decreases quicker when not being used, even when no current is flowing out of the battery. Other parameters include an internal impedance of the low-voltage battery and a capacity of the low-voltage battery.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle method comprising:
   by a controller,
   charging via an electric vehicle charge station a low-voltage battery when a module, powered by the low-voltage battery, is awake; and
   in response to an SOC of the low-voltage battery exceeding a threshold, commanding the module to enter a sleep mode for a duration defined by an average power draw of the module while awake.

2. The method of claim 1, wherein the duration increases as the average current draw of the module increases.

3. The method of claim 1, wherein the duration is further defined by a profile of a current of the low-voltage battery indicative of a customer driving habit that includes electronic power steering usage, air conditioning usage, and seat heater usage.

4. The method of claim 1 further including adjusting the duration based on a battery parameter.

5. The method of claim 4, wherein the battery parameter is a temperature, an age, or a capacity of the low-voltage battery.

6. The method of claim 4, wherein the battery parameter is a self-discharge rate or an internal impedance of the low-voltage battery.

7. A vehicle comprising:
   a module powered by a low-voltage battery; and
   a controller configured to, while coupled with a charge station, route current to the low-voltage battery after expiration of a time period that has a duration defined by a change in current of the low-voltage battery associated with operation of the module and a parameter associated with the low-voltage battery.

8. The vehicle of claim 7, wherein the parameter is a temperature, an age, or a capacity of the low-voltage battery.

9. The vehicle of claim 8, wherein the duration decreases as the temperature of the low-voltage battery increases.

10. The vehicle of claim 7, wherein the parameter is a self-discharge rate or an internal impedance of the low-voltage battery.

11. The vehicle of claim 10, wherein the duration decreases as the internal impedance increases.

12. The vehicle of claim 7, wherein the duration is further defined by a profile of a current of the low-voltage battery indicative of a customer driving habit that includes a desired interior temperature of the vehicle, and seat heater usage.

13. A vehicle comprising:
   a controller configured to, while coupled with a charge station, route current from the charge station to a low-voltage battery in response to (i) an SOC of the low-voltage battery being below a threshold and (ii) an expiration of a sleep duration that is defined by a change in current of the low-voltage battery and a parameter associated with the low-voltage battery.

14. The vehicle of claim 13, wherein the parameter is a capacity of the low-voltage battery.

15. The vehicle of claim 13, wherein the parameter is an internal impedance of the low-voltage battery.

16. The vehicle of claim 13, wherein the sleep duration is further defined by a profile of a current of the low-voltage battery indicative of a customer driving habit that includes a desired temperature of an interior of the vehicle, and seat heater usage.

17. The vehicle of claim 16, wherein the parameter is a temperature, an age, or a capacity of the low-voltage battery.

18. The vehicle of claim 16, wherein the parameter is a self-discharge rate or an internal impedance of the low-voltage battery.

19. The vehicle of claim 13, wherein the sleep duration decreases as the low-voltage battery current increases.

\* \* \* \* \*